United States Patent [19]

Koruthu

[11] Patent Number: 4,598,211
[45] Date of Patent: Jul. 1, 1986

[54] TIDAL ENERGY SYSTEM

[76] Inventor: John Koruthu, P.O. Box 5228, Safat, Kuwait

[21] Appl. No.: 571,108

[22] Filed: Jan. 16, 1984

[51] Int. Cl.$^4$ ............................................. F03B 13/12
[52] U.S. Cl. ....................................... 290/53; 290/42; 417/330
[58] Field of Search ...................... 417/100, 330–333; 290/42, 53; 60/497, 498

[56] References Cited

U.S. PATENT DOCUMENTS

| | | | |
|---|---|---|---|
| 416,972 | 12/1889 | Thomas | 417/333 |
| 1,864,499 | 6/1932 | Grigsby | 290/42 |
| 3,487,228 | 12/1969 | Kriegel | 290/53 |
| 3,515,889 | 6/1970 | Kammerer | 290/53 |
| 3,994,629 | 11/1976 | Kah-Sun | 417/330 |
| 4,009,395 | 2/1977 | Long et al. | 290/53 |
| 4,425,510 | 1/1984 | Jury | 290/53 X |
| 4,454,429 | 6/1984 | Buonome | 290/42 |

FOREIGN PATENT DOCUMENTS

| | | | |
|---|---|---|---|
| 7417937 | 12/1975 | France | 290/53 |
| 115869 | 11/1981 | Japan | 417/330 |
| 165775 | 12/1981 | Japan | 290/42 |

Primary Examiner—William M. Shoop, Jr.
Assistant Examiner—W. E. Duncanson, Jr.
Attorney, Agent, or Firm—Paul H. Gallagher

[57] ABSTRACT

Float/weights are positioned in the tidal water, arranged to rise and fall with the tides. A power unit including a cylinder and piston is arranged with the piston connected with the float/weights, and draws water into it upon the float/weights rising and forcing it into a storage unit upon the float/weights dropping. The storage unit includes a cylinder and a weighted piston. After the storage unit is filled, the water is let out to drive a water turbine and generator. The apparatus may use a closed circuit for the water, or an open circuit and draw it directly from the sea and return it to the sea. In the use of a closed circuit, instead of sea water, the apparatus may use fresh water, or oil. The apparatus is also adapted to use compressed gas instead of liquid.

6 Claims, 6 Drawing Figures

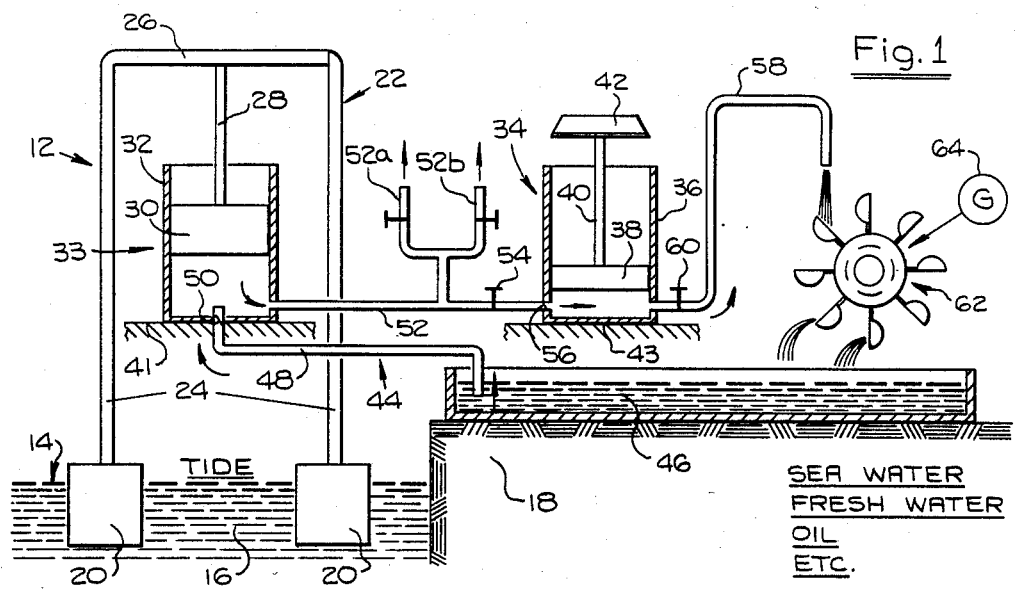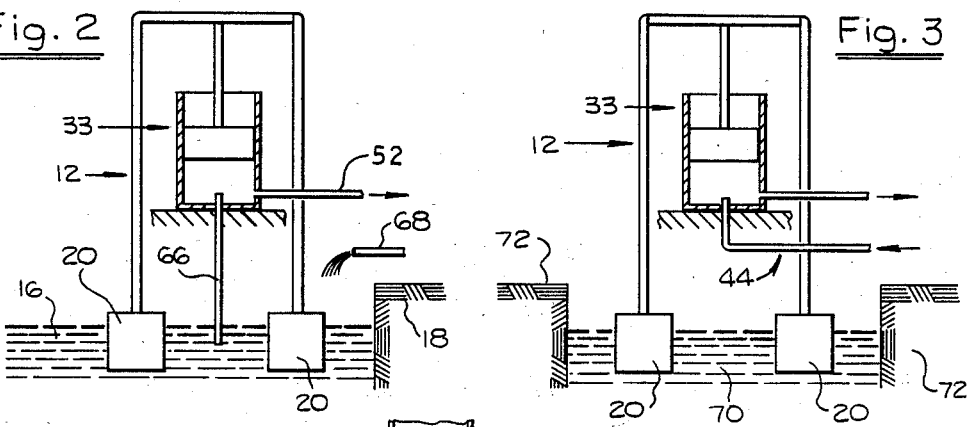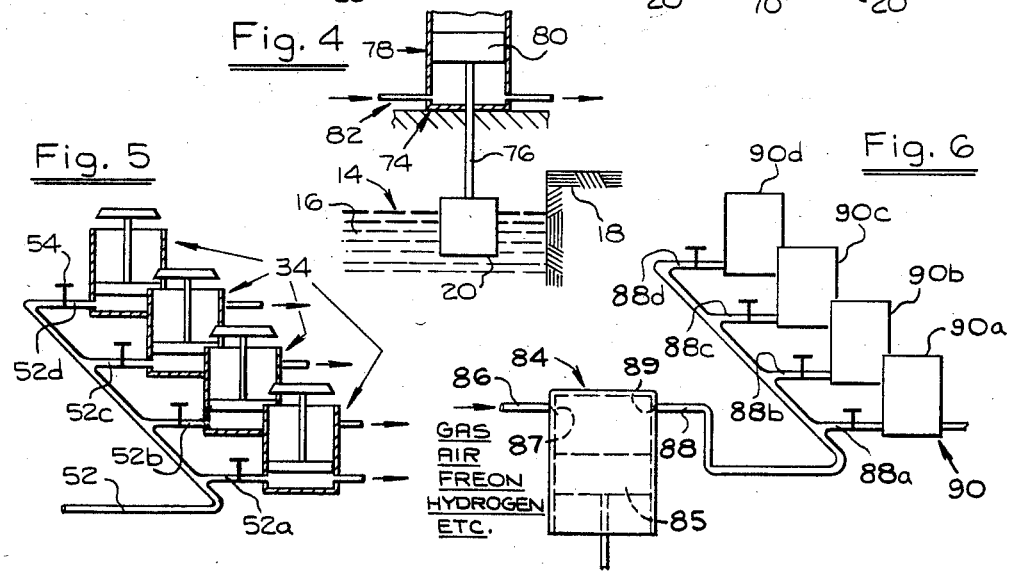

TIDAL ENERGY SYSTEM

OBJECTS OF THE INVENTION

The principal object of the invention is to provide a system, apparatus and method, for utilizing the kinetic energy of the sea tides for storing potential energy and utilizing the latter in a controlled manner for producing work, and particularly such having the following features and advantages:

1. An extremely simple apparatus is capable of effectively utilizing the enormous power of the sea tides.
2. The apparatus is fully efficient regardless of the extent of the tide, whether the tide rises to a great height or to a lesser height.
3. The system utilizes a liquid circuit work cycle, which provides great flexibility in its use.
4. The system is adaptable to use of sea water in an open circuit work cycle, and can alternatively be provided with a closed circuit work cycle and thereby adapted to use of such medium as oil and other liquids.
5. The system is adaptable to providing a work cycle component of multiple units energized simultaneously but selectively individually utilized in producing work, thereby providing additional flexibility of the system.

DESCRIPTION OF CERTAIN PREFERRED EMBODIMENTS:

In the drawings:

FIG. 1 is a diagramatic view of the apparatus embodying the principles of the present invention, utilizing a closed liquid circuit;

FIG. 2 is a diagramatic view of a portion of the apparatus utilizing an open liquid circuit;

FIG. 3 is a diagrammatic view representing a further modified arrangement;

FIG. 4 is a diagrammatic view representing still another arrangement;

FIG. 5 is a diagrammatic view of a fragment of apparatus showing a plurality of storage units, and;

FIG. 6 is a fragmentary view of an arrangement showing a plurality of storage units for use with gases, as distinguished from liquids, in the work cycle.

Referring to the drawings in detail, it is pointed out that the representations therein are of basic diagrammatic nature. Only the principal components are depicted, and these in their basic forms. It will be understood that many details will be incorporated in the apparatus according to the circumstances surrounding each installation.

FIG. 1 shows the complete apparatus indicated in its entirety at 12, as installed for operation. The sea is indicated at 14, including the tide water 16 and the shore 18 which may be a bank or a quay.

The apparatus includes one or more float/weights 20 which are disposed in the water. It is pointed out that these members 20 are the immediate means for producing the power in the apparatus. These members 20 must float but they are of a density only slightly less than that of the water so as to provide maximum weight for any particular volume. It is desired to have these members 20 as large as possible, and only limited by practical consideration, such for example, as barges which are of immense outline size, i.e., length and width. As the tide rises, the barges of course rise, and the overall size, i.e., area, as viewed vertically, works to advantage both in rising and dropping. In rising, they transmit the power of the tide, and in dropping they provide the desired power by their weight, both movements producing the desired and immense power. There is virtually no limit to the power that can be derived, which is limited only by practical considerations in dimensioning and locating the apparatus.

In the present case, FIG. 1, two such float/weights 20 are utilized, and rising therefrom is a linkage 22 having uprights 24 connected with a cross piece of header 26. Mounted on the cross piece 26 is a depending shank 28 connected to a piston 30 in a cylinder 32, the cylinder and piston constituting a power unit, or pump, or driver, 33. As is noted, the cylinder 32 is vertically arranged, and on the rising and dropping of the float/weights 20, the piston 30 correspondingly moves in the cylinder. It will be understood that the linkage 22 may take any specific form desired, for connecting between the float/weights and the piston.

Associated with the power unit 33 is a storage unit 34 which in the present embodiment, includes a vertical cylinder 36 and a piston 38 riding therein. Leading upwardly from the piston is a stem 40 bearing a weight 42 of substantial mass.

The power unit 33 and the storage unit 34 are mounted at any convenient location, such as on fixed platforms or foundations 41, 43.

Connected with and between this power unit 33 and the storage unit 34 is a conduit system indicated in its entirety 44 for conducting working fluid through the apparatus in the working phase thereof. FIG. 1 shows a closed cycle liquid system, as compared with utilizing the water directly from the sea which is referred to hereinbelow. In the closed cycle system, FIG. 1, a reservoir tank 46 is provided and located in a suitable position, such as on the bank or quay 18. An inlet conduit or pipe 48 leads from the tank 46 to the lower end of the cylinder 32, and a one-way valve, or check valve 50, is provided.

Another conduit 52 leads from the lower end of the cylinder 32 to the lower end of the cylinder 36, and preferably is provided with a gate valve 54, and a one-way valve or check valve 56 where the conduit leads into the cylinder 36. Leading from the outlet conduit 52 are branch conduits 52a, 52b, for communication with additional storage units. Another conduit 58 leads from the lower end of the cylinder 36 and preferably is provided with a gate valve 60.

Included in the apparatus is a prime mover 62 which in the present instance is a water turbine, or wataer wheel, connected with and driving a generator 64. The conduit 58 in the arrangement illustrated, includes an elevated section for directing the fluid onto the water turbine. After working the turbine, the spent water then returns to the tank 46. This reservoir tank with the conduit system, provides an effective closed circuit liquid system.

In the operation of the apparatus, the float/weights 20 rise with the incoming tide, and in so rising, raise the piston 30 in the power unit 33. This draws in the water from the tank 46, and this step continues as long as the tide rises. The vertical dimension of the cylinder 32 will be determined of course by the height of the highest tide, and from a practical standpoint the cylinder would be higher than the highest expected rise of the tide. As to the diameter or transverse dimensions of the power unit, this is determined by the power that can be developed by the float/weights, i.e., the buoyancy or flotation thereof. As indicated above, that power is immense, considering the fact that the float/weights may be constituted by barges, and hence the diameter of the cylinder 32 would be limited only by practical considerations. It is totally practicable to utilize a plurality of power units 33, and actually a large number of them, in association with a single barge.

The actuation of the power unit 33 is of course cyclic, with the rising and ebbing of the tide, and hence to take advantage of all of the water raised by the power unit, it is desirable to provide the storage unit 34 so that immediately as the tide recedes or ebbs, and the piston 30 drops, the water is transmitted to the storage unit, where it can be stored indefinitely. The water in being transmitted to the storage unit, raises the piston 38 which of course carries the weight 42 with it to elevated position. After the storage unit has been so filled, and thus energized, the water therein, together with the weight 42, constitute a source of potential energy. This water can thus be controlled in its emission from the storage unit, at the desired rate and to the desired location. For example, as represented in FIG. 1, that water is directed onto the water turbine 62 at the desired rate for turning it at a uniform and constant rate which is particularly advantageous for producing AC.

As noted above, the arrangement of FIG. 1 provides a closed circuit arrangement, that is, the liquid, or water, is reused by the use of the reservoir tank 46. In this arrangement, the system is not limited to sea water, and if it is desired to use fresh water, for example, that may be so used. Also, it is practical to use oil or any other liquid desired and practical.

The power unit 33, moving the liquid in the system, provides a source of kinetic energy, and this energy is converted to potential energy by storing it in the storage unit 34, and so stored as long as desired, and then utilized in operating the operating unit or turbine 62. The closed circuit system enables the components to be put in a compact arrangement and in a desired location for each of the components.

While the closed circuit arrangement of FIG. 1 may be desirable in many cases, the invention is not limited to such an arrangement, but may utilize the sea water directly as the liquid for the work cycle. Such an arrangement is represented in FIG. 2, where the apparatus 12 is arranged generally as in FIG. 1, that is, in the tidal water 16, but instead of utilizing the reservoir tank 46, an inlet conduit 66 leads directly from the sea water to the power unit 33, and a return conduit 68 leads from the exit of the water turbine 62 directly back to the sea.

FIGS. 1 and 2 present the apparatus associated directly with the open sea. The rough open sea may be objectionable in certain locations, and it is practical to utilize the apparatus in connection with a body of water, such as a canal, connected with the sea, in which the water is calm but rises and ebbs with the tide. Such an arrangement is represented in FIG. 3, where the apparatus is partially shown, and positioned as in FIG. 1, but instead of the open sea 14 a canal 70 is shown represented by the banks or quays 72 thereof.

FIG. 4 shows a power unit 74 different from that of FIG. 1. The float/weight 20 is shown in the water, from which rises a single rod 76 leading into the cylinder 78 and having the piston 80 of the cylinder mounted thereon, the cylinder 78 and piston 80 constituting a power unit 82 replacing the power unit 33 of FIG. 1. It will be understood that various kinds of power units may be utilized, the common feature being lifting a fluid thereinto, and forcing it out to the storage units.

FIG. 5 is a fragmentary diagrammatic view showing a plurality of storage units 34, connected with conduit branches 52a, 52b, 52c, 52d, themselves leading from the common conduit 52, these conduit branches preferably having gate valves 54 as referred to above.

The use of a plurality of storage units 34 as in FIG. 5, represents the practicability of using a plurality, and actually a large number, of such storage units. The power unit 82, as indicated above, may be of immense capacity due to the fact that the float/weights may be barges, and thus that large capacity of kinetic energy is transferred to the storage units wherein resulting potential energy is stored. There is no limit to the number of such storage units utilized, and they may be large or small depending on practical considerations, and this arrangement provides great flexibility in the choice and selection of the use of the storage potential energy, and enables the use thereof for different purposes. For example, one storage unit may be used for driving a water turbine, another for a water system, etc.

The apparatus is not limited to a liquid for the working fluid, but is equally adaptable to the use of a gas, which may be air, freon, hydrogen, etc. Such an arrangement is shown in FIG. 6. Instead of utilizing a power unit 33 for driving water into the storage unit, a compressor 84 may be used. The compressor may be of suitable kind having a piston 85 driven by the barge, and having an inlet 86 and an outlet conduit 88, the inlet and outlet having suitable check valves 87, 89. The conduit 88 leads through branch conduits 88a, 88b, 88c and 88d, to operating units 90 individually identified 90a, 90b, 90c, 90d. These operating units 90 may be any of various instrumentalities, such as paint sprayers, mixers, etc. In this case also the prime consideration is exemplified, namely, utilizing the kinetic energy of the tide and converting it to potential energy of the compressed gas.

I claim:

1. Tidal apparatus for producing energy by means of rising and ebbing sea tides, comprising,
   (A) a first main component,
   (B) a second main component,
   (C) linkage operably interconnecting the two main components,
   A. said first main component including a float/weight in the sea, of indeterminate maximum dimensions, of a density less, but only slightly less, than the sea water, so as to float therein and of maximum weight/volume ratio, and being contained only by the sea water and supported only by flotation by the sea water, and being movable into and out of an operable position adjacent to an operating position on the land, the float/weight being movable bodily as a whole in vertical directions in direct response to the tidal movements in proportion to its own dimensions,
   B. said second main component being mounted on and supported by the land in said operating position, and independently of the sea water, and having at least a portion located above the first main component, for operating cooperation between the two main components,
   said second main component including,
   1. a power unit including a vertical cylinder and piston and being located in said portion located above the first main component,
   2. a storage unit,
   3. a conduit system operative for conducting fluid from a source to the power unit and from the power unit to the storage unit in response to operation of the power unit,
4. an operating unit, and
5. the storage unit being capable of moving fluid therein to the operating unit for operating the latter,
C. said linkage being interconnected between the float/weight and the piston in the power unit, whereby to operate the power unit in response to vertical movements of the float/weight.

2. Tidal apparatus according to claim 1, wherein,
the storage unit includes a vertical cylinder and weighted piston therein, and
the power unit and storage unit, and the conduit system, are arranged and operative for utilizing liquid as said fluid.

3. Tidal apparatus according to claim 2 wherein,
the power unit and storage unit are arranged and operative for utilizing sea water as said fluid, and operative for drawing water from the sea and for conducting sea water from the operating unit in return to the sea.

4. Tidal apparatus according to claim 2 wherein,
the apparatus includes a reservoir for holding liquid, the conduit system is operative for conducting the fluid from the reservoir to the power unit, and conducting spent fluid from the operating unit in return to the reservoir, thereby forming a closed circuit for the fluid.

5. Tidal apparatus according to claim 1 wherein,
the power unit is operable for forcing fluid to the storage unit in each cycle of rising/ebbing of the tide, and the storage unit has capacity independent of a single said cycle, and
the apparatus having means for controlling the movement of the fluid from the storage unit to the operating unit idependently of said cycles.

6. Tidal apparatus according to claim 1 wherein,
the operating unit is constituted by a turbine and generator, and the apparatus includes means for controlling the movement of fluid to that unit at a uniform rate, whereby to enable the utilization of an AC generator or an operative part of the unit.

* * * * *